United States Patent Office 3,544,546
Patented Dec. 1, 1970

3,544,546
MIXED CHROMIUM COMPLEX
MONOAZO DYESTUFFS
Allen Crabtree and Graham Holmes, Manchester, England, assignors to Imperial Chemical Industries Limited, Millbank, London, England, a corporation of Great Britain
No Drawing. Filed Jan. 9, 1967, Ser. No. 607,913
Claims priority, application Great Britain, Jan. 31, 1966, 4,174/66
Int. Cl. C09b 45/16; D06p 1/02
U.S. Cl. 260—145   5 Claims

ABSTRACT OF THE DISCLOSURE

Mixed 1:2-complex reactive dyes in which the metal is chromium or cobalt, and the two dyestuff molecules are different, have at least 3 sulfonic acid groups to ensure adequate water solubility and have three cellulose-reactive groups divided between the two molecules. These reactive groups are acyl or heterocyclic radicals containing an atom or group capable of entering into reaction with the hydroxyl groups of cellulose. The preferred dyestuffs are chromium or cobalt complexes of compounds of the formula

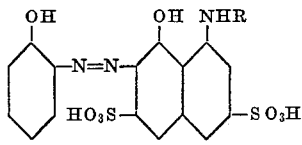

where one of the benzene nuclei contains a NHR group; R is a cellulose-reactive group, and other substituents of the kind readily available in o-aminophenols can be present in this or the other benzene nucleus, for example, $NO_2$, $SO_3H$, Cl. The preferred reactive group is the 2-chloro-4-amino-s-triazine group. These dyes are black reactive dyes with very high fixation.

RELEVANT PRIOR ART

U.S. Pat. No. 2,929,809, U.S. Pat. No. 2,943,084, U.K. Pat. No. 952,461.

DETAILED DESCRIPTION

According to the invention there are provided metal complex reactive dyestuffs having one atom of chromium or cobalt complexly bound to two different metallisable monoazo compounds which together contain at least three cellulose-reactive groups attached to benzene or naphthalene nuclei through a linking nitrogen atom, each cellulose-reactive group comprising an acyl or heterocyclic radical containing an atom or group capable of entering into reaction with the hydroxyl groups of the cellulose molecule.

As examples of cellulose-reactive groups there may be mentioned, for example, the radicals of α:β-unsaturated aliphatic carboxylic acids such as acrylic acid, α-chloroacrylic acid, propiolic acid, maleic acid and mono- and di-chloromaleic acids, and more particularly, the radicals of acids which contain a labile halogen atom or a group which readily splits off to form an anion, for example, the radical of a halogenated aliphatic acid such as chloroacetic acid, β-chloro and β-bromo-propionic acids and α:β-dichloropropionic acid or more especially, a heterocyclic radical which contains from 2 to 3 nitrogen atoms in the heterocyclic ring and at least one labile substituent on a carbon atom of the ring. By a labile substituent there is meant an atom or group which is bound to a carbon atom in ortho position to a nitrogen atom of the heterocyclic ring which atom or group is readily replaced by a hydroxyl group under aqueous alkaline conditions, since such atoms or groups are capable of reacting with hydroxyl groups of the cellulose molecule.

As examples of such heterocyclic radicals, there may be mentioned, for example 2,3-dichloro-quinoxaline-5- or 6-sulphonyl, 2,3-dichloro-quinoxaline-5- or 6-carbonyl, 2,4-dichloro-quinazoline-6- or 7-sulphonyl, 2,4,6-trichloroquinazoline-7- or 8-sulphonyl, 2,4,7- or 2,4,8-trichloroquinazoline-6-sulphonyl, 2,4-dichloro-quinazoline-6 - carbonyl, 1,4-dichloro-phthalazine-6 - carbonyl, and, more particularly s-triazine-2-yl and pyrimidin-2-yl or 4-yl radicals which contain on at least one of the remaining 2,4 or 6 positions, a bromine or, preferably, a chlorine atom, a sulphonic acid group, a thiocyano group, an aryloxy or arylthio group containing an electronegative substituent such as sulphophenoxy, sulphophenylthio, nitrosulphophenoxy, disulphophenoxy and sulphonaphthoxy; or a group of the formula:

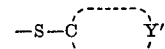

wherein Y' represents the group of atoms necessary to form a 5- or 6-membered heterocyclic ring which may carry substituents or form part of a fused ring system; or a quaternary ammonium or pyridinium group; or a group of the formula:

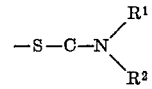

wherein $R^1$ and $R^2$ each represent the same or different alkyl, cycloalkyl, aryl or aralkyl groups, or $R^1$ and $R^2$ together form, together with the nitrogen atom, a 5- or 6-membered heterocyclic ring; or a group of the formula:

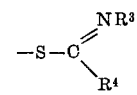

wherein $R^3$ and $R^4$ may be the same or different and each represents a hydrogen atom or an alkyl, aryl or aralkyl group.

In the cases where the reactive group is a triazine ring carrying only one such labile substitutent, the said ring may have a non-labile substituent on the remaining carbon atom.

By a non-labile substituent there is meant a group which is bound by a covalent bond to the carbon atom of the triazine nucleus, which covalent bond is not ruptured under the conditions used for application of the reactive dye. An example of such substituents, there may be mentioned, for example, primary amino and hydroxyl groups, also mono- or di-substituted amino groups etherified hydroxyl and etherified mercapto groups; in the case of substituted amino groups, this class includes, for example, mono- and di-alkylamino groups in which the alkyl groups preferably contain at most 4 carbon atoms, and which may also contain such substituents as chlorine atoms or hydroxyl, alkoxy or sulphate groups; and phenylamino and naphthylamino groups preferably containing sulphonic acid substituents; in the case of etherified hydroxyl and mercapto groups, this class includes, for example alkoxy and alkylthio groups preferably those of low molecular weight, i.e. having up to about 4 carbon atoms and phenoxy, phenylthio, naphthoxy or naphthylthio groups; as particular examples of all these classes there may be mentioned, for example, methylamino, ethylamino, dimethylamino, β - hydroxyethylamino, di - (β-hydroxyethyl)amino, β-chloroethylamino, cyclohexylamino, anilino, sulphophenylamino, disulphophenylamino, N - methylsulphophenylamino, N-β-hydroxyethyl-sulphophenylamino, carboxyphenylamino and sulphocarboxyphenylamino, methoxy, ethoxy and butoxy, phenoxy, methylphenoxy, chlorophenoxy and phenylthio groups. In the case of pyrimidinyl radicals, chlorine atoms or cyano, nitro, carboxy or carbalkoxy groups in the 5-position of a pyrimidine nucleus come into the category of non-labile substituents.

It is preferred that each reactive group should be a s-triazinyl radical containing at least one chlorine atom, above all, the 4-chloro-6-amino-s-triazin-2-yl radical, since the dyestuffs containing such radicals have an unusually high efficiency of fixation even in the strong shades necessary to give black dyeings or prints.

The metallisable monoazo compounds complexly bound in the new dyestuffs are preferably phenylazonaphthalene or azonaphtalene compounds having a hydroxy or a carboxy group o to the azo group in each nucleus; for example, o-(o'-carboxyphenylazo)hydroxynaphthalene compounds, o,o'-dihydroxyazonaphthalene or o,o'-dihydroxyphenylazonaphthalene compounds, but other metallisable monoazo compounds can be present, for example o,o'-dihydroxyazobenzene compounds, o-hydroxy-o'-carboxyazobenzene compounds, o-hydroxyphenylazopyrazolone compounds, o-hydroxynaphthylazo-pyrazolone compounds.

The new dyestuffs contain at least 3 sulphonic acid groups, which may be distributed in any desired manner in the molecule. It is preferred that the dyestuffs should have from 4 to 6 inclusive, sulphonic acid groups, depending on the molecular weight of the dyestuff.

According to a further feature of the invention, there is provided a process for the manufacture of the new metal-complex reactive dyestuffs which comprises reacting a metal-complex compound having one atom of chromium or cobalt complexly bound to two different metallisable monoazo compounds which together contain three acrylatable amino groups on benzene or naphthalene nuclei, with the halide or anhydride of an acid carrying a substituent capable of entering into reaction with the hydroxyl groups of the cellulose molecule, the reactants together containing at least 3 sulphonic acid groups.

The treatment of the metal complex compound with the acid halide or anhydride can conveniently be carried out by stirring an aqueous solution of the complex with an aqueous suspension or solution of the acid halide or anhydride and is preferably carried out in the presence of an acid-binding agent; the temperature of the reaction can be varied from 0° to 100° C. and will depend on the ease with which water will react with the acid halide or anhydride group or the group capable of reacting with the fibre.

As examples of anhydrides or acid halides which may be used, there may be mentioned, for example, the anhydrides or acid halides of α:β-unsaturated aliphatic acids such as chloromaleic anhydride, propiolyl chloride and acrylyl chloride, the acid chlorides of halogenated aliphatic acids such as chloroacetyl chloride, sulpho-chloroacetyl chloride, β-bromo and β-chloropropionyl chloride and α:β-dichloropropionylchloride, and preferably, heterocyclic compounds which contain at least 2 nitrogen atoms in the heterocyclic ring and which contain 2 or more halogen, especially chlorine, atoms in the ortho positions to the nitrogen atoms, such as 2,3-dichloroquinoxaline-5- and 6-carboxylic acid chlorides, 2,3-dichloro-quinoxaline-5- and 6-sulphonyl chlorides,
2,4-dichloro-quinazoline-6- and 7-sulphonyl chlorides,
2,4,6-trichloro-quinazoline-7- and 8-sulphonyl chlorides,
2,4,7- and 2,4,8-trichloro-quinazoline-6-sulphonyl chlorides,
2,4-dichloro-quinazoline-6-carboxylic acid chloride,
1,4-dichloro-phthalazine-6-carboxylic acid chloride,
2,4,6-tri-bromo and tri-chloropyrimidines,
2,4,5,6-tetrachloropyrimidine,
5-methyl-2,4,6-trichloropyrimidine,
5-nitro-2,4,6-trichloropyrimidine,
2,4-dichloro-5-nitro-6-methylpyrimidine,
2,4-dichloro-5-nitropyrimidine,
2,4,6-trichloro-5-cyanopyrimidine,
5-carboxy-2,4-dichloropyrimidine, 5-carboethoxy-2,4-dichloropyrimidine, cyanuric bromide and, preferably cyanuric chloride and the primary condensation products of cyanuric bromide or cyanuric chloride with ammonia, an alkali metal sulphite or thiocyanate or an organic mercaptan, hydroxy compound or an organic primary or secondary amine, for example methanol, ethanol, iso-propanol, phenol, o-, m- and p-chlorophenols, o-, m- and p-cresols, o-, m- and p-sulphophenols, thiophenol, thioglycollic acid, dimethyldithio carbamic acid, mercaptobenzthiazole, thioacetamide, methyl-, dimethyl-, ethyl-, diethyl, p-propyl, iso-propyl-, butyl-, hexyl or cyolo hexylamine, toluidine, piperidine, morpholine, methoxyethylamine, ethanolamine, aminoacetic acid, aniline-2:5-, 2:4-, and 3:5-disulphonic acids, orthanilic, metanilic and sulphanilic acids, 2,3 and 4-aminobenzoic acids, 4- and 5-sulpho-2-aminobenzoic acids, 5-amino-2-hydroxybenzoic acid, 2-aminoethanesulphonic acid, aminonaphthalene mono- and disulphonic acids and N-methylaminoethane sulphonic acid; also, the secondary condensation products of cyanuric chloride with alkali metal sulphites, alkali metal thiocyanates, phenols and thiophenols containing an electronegative substituent, and compounds of the formulae

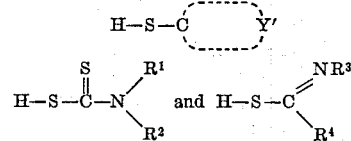

wherein Y' R¹, R², R³ and R⁴ have the meanings stated above.

The metal-complex compounds used in the above process can be obtained by reacting together, by methods known per se, one equivalent each of a chromium or cobalt salt and two different metallisable monoazo compounds which together contain 3 acylatable amino groups attached to benzene or naphthalene nuclei. Whilst it is possible to use the mixtures of compounds obtained by a simultaneous reaction of all three reactants, it is preferred, in general, to use a substantially homogeneous metal-complex compound, obtainable, for example, by first forming a 1:1-chromium or cobalt complex of one metallisable monoazo compound and reacting this complex with the other metallisable monoazo compound. It is preferred that the acylatable amino groups should be distributed so that two are in one monoazo compound and one in the other. The metallisable monoazo compounds can be obtained in the usual manner by coupling together diazo and coupling components having structures leading to the formation of a metallisable monoazo dyestuff, either already containing the desired acylatable amino groups, or containing groups such as acetylamino or nitro which can be converted to amino by reduction or hydrolysis.

Thus one amino group can be introduced into the monoazo compound by using, as diazo component, an o-aminophenol or an anthranilic acid which contains a nitro or acetylamino group, followed, as necessary, by reduction or hydrolysis, or by using a coupling component which couples ortho to a hydroxyl group and which contains an acylatable amino group, either in the same aromatic moiety as the hydroxyl group, as in an aminonaphthol, or in a pendant nucleus, for example in an aminoanilino naphthol or a 1-(aminophenyl)pyrazol-5-one coupling component.

The metal-complex reactive dyestuff in which each cellulose-reactive group is a 4-chloro-6-amino- or substituted amino-s-triazin-2-yl group can also be obtained by a modification of the above process wherein the metal-complex compound is reacted with cyanuric chloride and the resultant tris-(dichloro-s-triazine) compound is reacted with ammonia or a primary or secondary amine.

This modified process can also conveniently be carried out in aqueous medium, the first step being preferably carried out at a temperature of from 0° to 5° C. and the second at from 30° to 35° C. An acid-binding agent is preferably used to neutralise the liberated hydrogen chloride, and in the second step this can conveniently be carried out by using an excess of the amine or ammonia used as reactant.

According to yet a further feature of the invention there is provided a process for manufacture of the new metal-complex reactive dyestuffs which comprises reacting a metallisable monoazo compound with a 1:1-chromium- or cobalt-complex of a metallisable monoazo compound, the two metallisable monoazo compounds being different and so chosen that together they contain 3 cellulose-reactive groups and at least 3 sulphonic acid groups.

This process can conveniently be carried out by stirring a mixture of the two reactants in an aqueous medium at a temperature of from 50° to 60° C.

The new metal-complex dyestuffs can be isolated from the media in which they have been formed by the normal techniques for isolating water-soluble reactive dyes. In some cases they can be obtained by spray drying the whole reaction mixture but in general it is preferable to precipitate in the form of an alkali-metal salt, for example, by the addition of sodium chloride, and to filter off and dry the resultant precipitate. In some cases it is desirable to add stabilising agents before drying, for example, mixtures of alkali-metal acid phosphates or tertiary alkylamine sulphonates as described and claimed in United Kingdom specifications Nos. 838,337 and 842,933.

The new metal-complex azo dyestuffs are valuable for colouring cellulose textile material, for example, textile materials comprising natural or regenerated cotton. For colouring such textile materials, the new metal complex azo dyestuffs are preferably applied, either by a dyeing or printing process, to the cellulose textile materials in conjunction with a treatment with an acid-binding agent, for example sodium hydroxide, sodium carbonate or sodium bicarbonate which may be applied to the cellulose textile material before, during or after the application of the dyestuffs. Alternatively when the colouration process involves the use of a heating step a substance can be used, for example, sodium trichloroacetate, which is changed into an acid-binding agent during the heating step. When so applied to cellulose textile materials the new metal complex azo dyestuffs react with the cellulose and can be built up to give strong shades, having very good fastness to light and to wet treatments especially to severe washing.

The invention is illustrated but not limited by the following examples in which parts and percentages are by weight:

Example 1

A mixture of 17.9 parts of the 1:1-chromium complex of the monoazo compound obtained by the alkaline coupling of 6-nitro-1-diazo-2-oxynaphthalene-4-sulphonic acid with 1-hydroxy-8-aminonaphthalene-3:6-disulphonic acid, and 10.4 parts of the monoazo compound obtained by the alkaline coupling of 5-acetylaminoanthranilic acid with 2-amino-8-naphthol-6-sulphonic acid followed by hydrolysis of the acetylamino group, in 300 parts of water at pH 8.5 is stirred and boiled under a reflux condenser for one hour.

The solution is cooled to 15° C. and added slowly to a stirred suspension of 15 parts of cyanuric chloride in a mixture of 90 parts of water and 75 parts of acetone maintained at 0° C. by cooling, at the same time adding 10% aqueous sodium carbonate solution so that the pH is maintained within the limits of 6.0 and 6.5. The mixture is stirred until the cyanuric chloride has appeared to dissolve and HCl is no longer liberated. 25 parts of a 30% aqueous solution of ammonia are then added slowly and the solution is heated to 35–40° C. during 1 hour, and maintained at this temperature for 1 hour. The solution is then filtered and the dyestuff precipitated by addition of potassium acetate. The dyestuff is filtered off, washed well with ethanol and dried.

When printed on cellulose textiles in the presence of alkali there are obtained neutral black shades of high fixation with good fastness to light and to wet treatments.

The following table gives further examples of the invention which may be obtained by reacting the 1:1-chromium complex of the monoazo compound named in column II with the monoazo compound named in column III, reacting the product with the equivalent amount of cyanuric chloride and reacting the dichlorotriazine so formed with the amine listed in column IV. The shades obtained when the dyestuffs are printed on cellulose textiles are given in column V.

| I | 1:1-Chromium complex | Monoazo compound | Amine | Shade |
|---|---|---|---|---|
| 2 | 1-amino-7-(2'-hydroxy-4'-sulpho-6'-nitronaphthylazo)-8-naphthol-3:6-disulphonic acid. | 6-amino-2-(2'-hydroxy-4'-sulpho-6-aminonaphthylazo-1-naphthol-3-sulphonic acid. | Ammonia. | Black. |
| 3 | 6-amino-2-(2'-hydroxy-4'-sulpho-6'-nitronaphthylazo)-1-napthol-3-sulphonic acid. | 1-amino-7-(2'-carboxy-4'-aminophenylazo)-8-naphthol-3:6-disulphonic acid. | do | Do. |
| 4 | 1-amino-7-(2'-hydroxy-5'-nitrophenylazo)-8-naphthol-3:6-disulphonic acid. | do | do | Do. |
| 5 | do | 1-amino-7-(2'-hydroxy-3'-amino-5'-sulpho-naphthol-3:6-disulphonic acid. | do | Blue-black. |

Example 6

A mixture of 7.35 parts of the 1:1-chromium complex of 1-amino-7 - (2' - hydroxy-5'-nitrophenylazo)-8-naphthol-3:6-disulphonic acid and 6.54 parts of 1-amino-7-(2'-hydroxy-3'-amino-5' - sulphophenylazo)-8-naphthol-3:6-disulphonic acid in 250 parts of water at pH 7–8 is stirred and boiled under a reflux condenser for 2 hours.

The solution is cooled to 15° C. and added slowly to a stirred suspension of 7.5 parts of 2:4-dichloro-6-methoxy-s-triazine in a mixture of 100 parts of water and 50 parts of acetone maintained at 0–5° C. by external cooling, and maintaining the pH of the mixture at 6–7 by addition of 10% sodium carbonate solution as required. When the addition is complete, the temperature of the mixture is raised to 30° C. during 1 hour, and maintained at this temperature for 1 hour, maintaining the pH at 6–7 throughout by addition of 10% sodium carbonate as required. The solution is then filtered and the dyestuff precipitated by addition of potassium acetate. The dyestuff is filtered off, washed well with ethanol and dried.

When printed on cellulose textiles in the presence of alkali there are obtained blue/black shades of high fixation with good fastness to light and to wet treatments.

If in place of the 1:1-chromium complex above there is used the equivalent amount of the corresponding 1:1-cobalt complex there is obtained a dyestuff which gives reddish black shades when printed on cellulose textiles of high fixation and with good fastness to wet treatments and to light.

Example 7

A mixture of 10.0 parts of the 1:1-chromium complex of 1-(2'-chloro - 4' - anilino-s-triazinyl - 6'-ylamino)-7-(2'-hydroxy-5'-nitrophenylazo) - 8 - naphthol-3:6-disulphonic acid and 13.8 parts of 1-[2'-chloro-4'-(3''-sulphoanilino)-s-triazin - 6' - ylamino] - 7-[2'-hydroxy-3'-{2''-chloro - 4'' - (3'''-sulphoanilino)-s-triazin-6''-ylamino}-5'-sulphophenylazo]-8-naphthol-3:6-disulphonic acid in 250 parts of water is stirred at pH 6.5 and 70° C. for 3½ hours when reaction is usually complete. The solution is cooled to 20° C., and the dyestuff precipitated by addition of potassium chloride. The dyestuff is filtered off and dried.

When printed on cellulose textiles in the presence of alkali there are obtained black shades of high fixation with good fastness to light and to wet treatments.

The following table gives further examples of chromium complexes of the invention which may be obtained by the methods described in Examples 1, 6 and 7. Columns II and III name metallisable monoazo compounds bound in the complex and Column IV names the reactive groups, three of which are attached to the complex through the amino groups.

| Ex. | Metallisable monoazo compounds | | Relative Group | Shade |
|---|---|---|---|---|
| 8 | 1-amino-7-(2'-hydroxy-5'-nitrophenylazo)-8-naphthol-3:6-disulphonic acid. | 1-amino-7-(2'-hydroxy-3'-amino-5'-sulphophenylazo)-8-naphthol-3:6-disulphonic acid. | 2-chloro-4-(3'-sulphoanilino)-s-triazin-6-yl. | Blue-black. |
| 9 | do | do | 2:4:5-trichloropyrimid-6-yl | Do. |
| 10 | do | do | 2:4-dichloropyrimid-6-yl | Do. |
| 11 | do | 6-amino-2-(2'-hydroxy-3'-amino-5'-sulphophenylazo)-1-naphthol-3-sulphonic acid. | 2-chloro-4-amino-s-triazin-6-yl | Black. |
| 12 | do | 6-amino-2-(2'-hydroxy-2'-amino-5'-sulphophenylazo)-1-naphthol-3:5-disulphonic acid. | do | Do. |
| 13 | do | do | 2-chloro-4-β-hydroxyethylamino-s-triazin-6-yl | Do. Do. |
| 14 | do | do | 2:4:5-trichloropyrimid-6-yl | Do. |
| 15 | do | do | 2-chloro-4-(4'-β-sulphatoethyl-sulphonylanilino)-s-triazin-6-yl. | Do. |
| 16 | do | do | 2:4-dichlorophyimid-6-yl | Do. |
| 17 | do | do | 2:4-dichloro-5-cyanopyrimid-6-yl | Do. |
| 18 | do | do | 1-(phenyl-4'-carbonyl)-4:5-dichlor-6-pyridazone. | Do. |
| 19 | do | do | 2:4-dichlorquinazoline-7-carbon-yl. | Do. |
| 20 | do | do | 2:3-dichlorquinoxaline-5-carbon-yl. | Do. |
| 21 | 4-methyl-2-(5'-aminophenylazo)phenol | 8-amino-2-(2'-hydroxy-3'-amino-5'-sulphophenylazo)-1-naphthol-3:6-disulphonic acid. | 2-chloro-4-(3':5'-disulphoanilino)-s-triazin-6-yl. | Do. Dull greenish grey. |
| 22 | do | do | 2-chloro-4-(3'-sulphoanilino)-s-triazin-6-yl. | Do. |
| 23 | 1-amino-6-(2'-hydroxy-3'-nitro-5'-sulphophenyl-lazo)-8-naphthol-3:6-disulphonic acid. | 1-amino-7-(2'-hydroxy-3'-amino-5'-sulphophenylazo)-8-naphthol-3:6-disulphonic acid. | 2-choro-4-amino-s-triazin-6-yl | Do. |
| 24 | do | do | 2-chloro-4-(4'β-sulphatoethyl-sulphonylanilino)-s-triazin-6-yl. | Do. |
| 25 | do | do | 2:4-dichloro-5-cyanopyrimidin-6-yl. | Do. |
| 26 | 1-amino-7(2'-hydroxy-3'-nitro-5'sulphophenyl-azo)-8-naphthol-3:6-disulphonic acid. | 1-amino-7-(2'-hydroxy-3'-amino-5'-sulphophenylazo)-8-naphthol-3:6-disulphonic acid. | 2:3-dichlorqlinoxaline-6-carbon-yl. | Black. |
| 27 | do | do | 2:3-dichlorquinoxaline-5-carbonyl. | Do. |
| 28 | do | do | 2:4-dichlorquinazoline-6-carbon-yl. | Do. |
| 29 | do | do | 2:4-dichlorquinazoline-7-carbon-yl. | Do. |
| 30 | do | 1-(2'-methyl-3'-amino-5'-sulphophenyl)-3-carboxy-4-(2'-hydroxy-3'-amino-5-sulphophenylazo)-5-pyrazolone. | 2-chloro-4-amino-s-triazin-6-yl | Brown. |
| 31 | do | do | 2-chloro-4-(3'-sulphoanilino)-s-triazin-6-yl. | Do. |
| 32 | do | do | 2-chloro-4-(3'-β-sulphatoethyl-sulphonylanilino)-s-triazin-6-yl. | Do. |
| 33 | do | do | 2:4-dichloro-5-cyanopyrimid-6-yl | Do. |
| 34 | do | do | 2:4:5-trichloropyrimid-6-yl | Do. |
| 35 | do | do | 2:3-dichlorquinoxaline-5-carbon-yl. | Do. |
| 36 | do | do | 2-chlor-4-β-ydroxyethylamino-s-triazin-6-yl. | Do. |

We claim:

1. A mixed 1:2 complex of chromium with two different metallisable monoazo compounds of which one is selected from the class consisting of o,o'-dihydroxyazo-naphthalene, o,o'-dihydroxyphenylazonaphthalene and o-(o'-carboxyphenylazo) hydroxynaphthalene compounds and the other is selected from the class consisting of o,o'-dihydroxyazonaphthalene, o,o'-dihydroxyphenylazonaphthalene and o-hydroxyphenylazopyrazolone in which the pyrazolone nucleus carries a benzene ring in the 1-position, further substituents on the benzene or naphthalene nuclei in said compounds being selected from the class consisting of $CH_3$, $NO_2$, $SO_3H$ and NHY, Y representing a cellulose-reactive heterocyclic radical selected from the class consisting of amino-chloro-s-triazine, methoxy-chloro-s-triazine, β-hydroxyethylamino-chloro-s-triazine, dichloropyrimidyl, trichloropyrimidyl, and cyano-dichloropyrimidyl and the total number of $SO_3H$ groups in the complex being from 4 to 6 inclusive, and the total number of cellulose-reactive heterocyclic radicals being 3 with a maximum of one of said radicals being substituted on any one benzene or naphthalene nucleus in the molecule.

2. Metal complex reactive dyes as claimed in claim 1 wherein the metallisable monoazo compounds are both o,o'-dihydroxyphenylazo naphthalene compounds.

3. Metal complex reactive dyes as claimed in claim 1 wherein the metallisable monoazo compounds are each represented by the formula

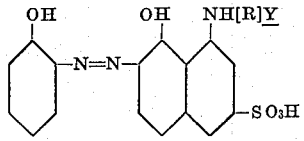

wherein the benzene nucleus in one of said compounds carries at least a —NHY group.

4. A metal complex reactive dye as claimed in claim 1 being the complex of chromium with 1 mole of the azo compound of formula

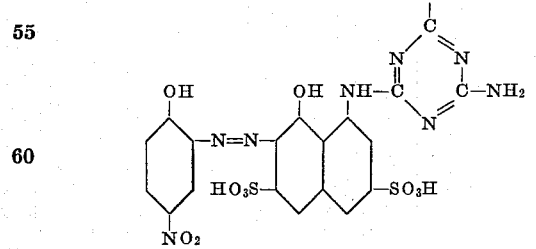

and 1 mole of the azo compound of formula

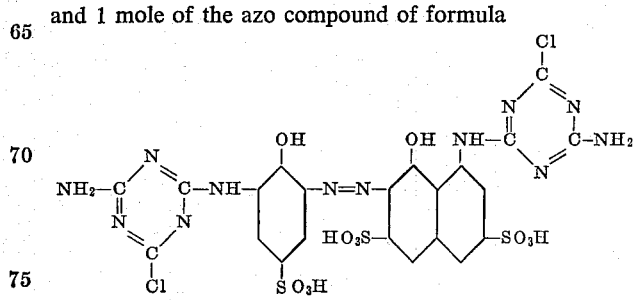

5. A metal complex reactive dye as claimed in claim 1 being the complex of chromium with 1 mole of the azo compound of formula
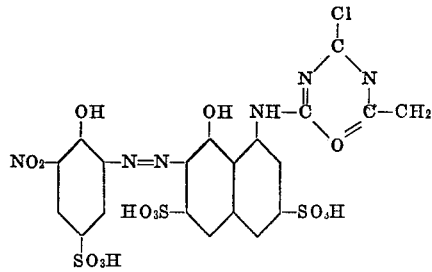
and 1 mole of the azo compound of formula
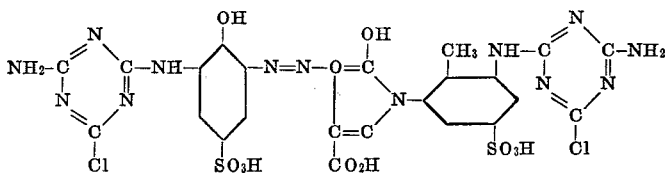
References Cited
FOREIGN PATENTS
1,353,102  1/1964  France.
CHARLES B. PARKER, Primary Examiner
D. M. PAPUGA, Assistant Examiner
U.S. Cl. X.R.
8—41, 51, 542; 260—153, 154, 194, 200